United States Patent
Stoller et al.

(10) Patent No.: US 6,849,208 B1
(45) Date of Patent: Feb. 1, 2005

(54) NICKEL MIXED HYDROXIDE, METHOD FOR THE PRODUCING THE SAME, AND THE USE THEREOF AS A CATHODE MATERIAL IN ALKALINE BATTERIES

(75) Inventors: Viktor Stoller, Bad Harzburg (DE); Armin Olbrich, Seesen (DE); Juliane Meese-Marktscheffel, Goslar (DE); Margret Wohlfahrt-Mehrens, Illertissen (DE); Peter Axmann, Ehrbach (DE); Herbert Dittrich, Winterbach (DE); Sandra Ströbele, Neu-Ulm (DE)

(73) Assignee: H. C. Starck GmbH, Goslar (DE)

( * ) Notice: Subject to any disclaimer, the term of this patent is extended or adjusted under 35 U.S.C. 154(b) by 0 days.

(21) Appl. No.: 09/868,995

(22) PCT Filed: Dec. 14, 1999

(86) PCT No.: PCT/EP99/09912

§ 371 (c)(1),
(2), (4) Date: Jun. 20, 2001

(87) PCT Pub. No.: WO00/39865

PCT Pub. Date: Jul. 6, 2000

(30) Foreign Application Priority Data

Dec. 24, 1998 (DE) .......................................... 198 60 143
Aug. 18, 1999 (DE) .......................................... 199 39 025

(51) Int. Cl.[7] .......................... H01M 4/52; C01G 53/04
(52) U.S. Cl. ................ 252/519.1; 252/500; 252/521.2; 252/518.1; 423/111; 423/138; 423/155; 423/594.3; 423/594.5; 429/223; 429/218.1; 429/209
(58) Field of Search .......................... 252/521.2, 518.1, 252/519.12; 429/223, 218.1, 209; 423/111, 138, 155, 594.3, 594.5

(56) References Cited

U.S. PATENT DOCUMENTS 5,518,704 A * 5/1996 Kelkar et al. ............. 423/420.2

(List continued on next page.)

FOREIGN PATENT DOCUMENTS

EP     0 390 677     10/1990

(List continued on next page.)

OTHER PUBLICATIONS

Zheng et al, "Synthesis of Non–Al–Containing Hydrotalcite–like Compound Mg0.3CoII0.6CoIII0.2(OH)2(NO3)2.H2O", Chem Mater. 1998, 10, 2277–2283.*

(List continued on next page.)

*Primary Examiner*—Mark Kopec
*Assistant Examiner*—Kallambella Vijayakumar
(74) *Attorney, Agent, or Firm*—Godfried R. Akoril; Diderico van Eyl

(57) ABSTRACT

The invention relates to a nickel mixed hydroxide with Ni as the main element and with a layer structure, comprising at least one element $M_a$ from the group comprising Fe, Cr, Co, Ti, Zr and Cu which is present in two different oxidation states which differ by one electron in terms of the number of outer electrons; at least one element $M_b$ from the group comprising B, Al, Ga, In and RE (rare earth metals) present in the trivalent oxidation state; optionally at least one element $M_c$ from the group comprising Mg, Ca, Sr, Ba and Zn present in the divalent oxidation state; apart from the hydroxide, at least one additional anion from the group comprising halides, carbonate, sulfate, oxalate, acetate, borate and phosphate in a quantity sufficient to preserve the electroneutrality of the mixed hydroxide; and water of hydration in a quantity which stabilizes the relevant structure of the mixed hydroxide.

12 Claims, 5 Drawing Sheets

U.S. PATENT DOCUMENTS

| | | | | |
|---|---|---|---|---|
| 5,635,313 A | * | 6/1997 | Abe | 429/223 |
| 5,670,271 A | | 9/1997 | Axmann | 429/59 |
| 5,773,169 A | | 6/1998 | Matsuda et al. | 429/223 |
| 6,156,454 A | * | 12/2000 | Bernard et al. | 429/223 |

FOREIGN PATENT DOCUMENTS

| | | | | | |
|---|---|---|---|---|---|
| FR | | 390677 A1 | * | 10/1990 | C01G/53/00 |
| JP | | 696076 A1 | * | 8/1995 | H01M/4/52 |
| JP | | 793285 A1 | * | 9/1997 | H01M/4/52 |
| JP | | 10097856 | | 4/1998 | |

OTHER PUBLICATIONS

Chemical Abstracts, vol. 130, No. 5, 1998, Columbus Ohio, US; Abstract No. 54866, I. Matsubara, M. Ueda: "Manufacture of Lithium Nickel Oxide and Cathode Active Mass Using it for Secondary Lithium Batter" XP002135820 & JP 10 316431A (Fuji Chemical Industry Co. Lt. Japan) Dec. 2, 1998.

* cited by examiner a)

b)

c)

NICKEL MIXED HYDROXIDE, METHOD FOR THE PRODUCING THE SAME, AND THE USE THEREOF AS A CATHODE MATERIAL IN ALKALINE BATTERIES

This application is the National Stage Application of PCT/EP99/109912, which claims a priority from German Applications 198 60 143.3 filed Dec. 24, 1998, and 199 39 025.8, filed Aug. 18, 1999.

BACKGROUND

The present invention relates to a nickel mixed hydroxide with Ni as the main element and with an expanded layer structure, a process for the preparation thereof by co-precipitation of the hydroxides in an alkaline medium and to the use thereof as cathode material in alkaline batteries.

β-Nickel(II) hydroxide is used in alkaline accumulators as positive electrode material. Changes in certain electrochemical properties may be obtained by incorporating foreign ions.

The incorporation of trivalent ions in the nickel hydroxide matrix in molar proportions of >20 mol % leads to a new structure. The materials thus altered have the structure of hydrotalcite and, in comparison with β-Ni(OH)$_2$, are characterised by an expanded layer structure in the intermediate layers of which water and various anions are present. The layer expansion alone has a fundamental influence on the electrochemistry, in this case on the potential position and electrochemical usefulness of the nickel ions. The trivalent cation used in each case exerts an additional effect on the electrochemical behaviour of the materials.

Single-substituent variants containing the substituents Fe, Mn, Co and Al are known from the literature. Most have improved utilisation of the nickel ions but their stability is not very pronounced. Others, on the other hand, have good cycle stability but the nickel utilisation is lower.

Substitution with a combination of two different cations is also found in the literature. EP 0 793 285 A1 describes nickel hydroxide materials which contain, for example, the elements Co or Mn in combination with elements such as, e.g., Fe, Al, La and others. Co and Mn are used in divalent form in the preparation of materials, no oxidising agents being used in the further course of preparation. Where preparation takes place by electrochemical (cathodic) deposition, precipitation even takes place in a reducing environment due to accompanying hydrogen evolution. Co is therefore present in the divalent form in the finished active material, together with trivalent cations such as Fe, Al, La amongst others The materials are analysed and assessed in terms of their potential position during the discharge process and charge acceptance at relatively high temperatures, but there are no details whatsoever about the cycle stability and actual electrochemical utilisation in the form of absolute values. Only relative capacities are given.

EP 0 712 174 A2 describes nickel hydroxides in which, in contrast to EP 0 793 285 A1, trivalent instead of divalent Mn ions are used as substituents in combination with other trivalent elements such as Al, Fe and Co. Mn is present in the product in the trivalent form together with Al, Fe or Co, and it is also possible for Mn to be present in several oxidation states simultaneously ("mixed valent") in the solid. These Mn-containing materials exhibit pronounced cycle stability but the nickel utilisation is only slightly above that of the conventional nickel hydroxides. No practical indications that the use of mixed valent systems other than Mn may lead to an improvement in the capacity and nickel utilisation can be derived from this prior art.

The object of the present invention is to provide a nickel mixed hydroxide which, whilst having good cycle stability, exhibits a marked improvement in the electrochemical utilisation of the nickel ions and the mass-related capacity. Moreover, a simple process for the preparation of such a nickel mixed hydroxide should be given.

This object is achieved by a nickel mixed hydroxide according to claim 1. Advantageous embodiments of the nickel mixed hydroxide according to the invention are given in subclaims 2 to 6.

DESCRIPTION

The invention provides, therefore, a nickel mixed hydroxide with Ni as the main element and with a layer structure comprising a) at least one element $M_a$ from the group comprising Fe, Cr, Co, Ti, Zr and Cu, which is present in two different oxidation states which differ by one electron in terms of the number of outer electrons;

b) at least one element $M_b$ present in the trivalent oxidation state from the group comprising B, Al, Ga, In and RE (rare earth metals, preferably Sc, Y or La);

c) optionally at least one element $M_c$ present in the divalent oxidation state from the group comprising Mg, Ca, Sr, Ba and Zn;

d) apart from the hydroxide, at least one additional anion from the group comprising halides (preferably fluoride or chloride), carbonate, sulfate, acetate, oxalate, borate and phosphate in a quantity at least sufficient to preserve the electroneutrality of the mixed hydroxide; and e) water of hydration in a quantity that stabilises the relevant structure of the mixed hydroxide.

Surprisingly, it became apparent according to the invention that particularly cycle-stable nickel mixed hydroxides with markedly increased nickel utilisation are obtained in particular when, apart from nickel, at least two other cations are present in the nickel hydroxide matrix, one of which ($M_a$) is selected from the group comprising Fe, Cr, Co, Ti, Zr and Cu, this being present in two different oxidation states which differ by one electron in terms of the number of outer electrons, that is, in a defined mixed valent form, and the other ($M_b$) from the group comprising B, Al, Ga, In and RE (rare earth metals) is present in the fixed trivalent oxidation state.

Such a material exhibits very good cycle stability in half-cell tests, a maximum electronic utilisation of 1.5 electrons per nickel ion being obtained.

In full-cell tests this material exhibits a utilisation of a constant 1.5 electrons per nickel ion during a measurement over 100 cycles, which corresponds to a specific capacity of more than 260 mAh/g.

The nickel hydroxide materials according to the invention exceed those in which the two additional cations (Ni substituents), as described in EP 0 793 285 A1, are present in a uniform oxidation state in each case, as shown by an electrochemical comparison in the example part below. They also exceed those nickel hydroxide materials in which, according to EP 0 712 174 A2, one additional cation is, for example, trivalent Al or Co and the other additional cation is Mn, which may be present simultaneously in different oxidation states.

The nickel hydroxide materials according to the invention may be prepared in densities favourable for use in secondary batteries, which densities correspond to those of β-nickel hydroxides having a regular morphology._

Without being bound by any particular theory, it may be assumed that several effects can be held responsible for these improvements:

1. It is assumed that lattice defects arise if the various Ni substituents $M_b(III)$, $M_a(III)$ and $M_a(II)$ are present in the material. If, for example, the element $M_a$ is present in the oxidation states (III)/(II), the proportion of trivalent cations and hence the charge of the main layer can be regulated by means of the $M_a(III)/M_a(II)$ ratio. The anion and water content of the structure depend on the latter. In hydrotalcite compounds, the anions in the interlayer are bound solely by electrostatic forces. If however, as in the material according to the invention, a substituent is also present in the divalent form in a defined proportion, it is conceivable that the anions in these domains (if the α-structure is present) may be bound in the same way as in basic salts, i.e. linked directly to the main layer. As a result, anisotropic lattice defects are induced (i.a. layer shifts) which may have positive effects on the activity of the material. Even when an electrochemical load is applied, lattice defects in the starting structure and hence the activity of the material remain intact over a relatively long period.

2. It is also possible that, if the material is used as an electrode material in the electrode, Co(II) ions, e.g., which are present in the edge regions, may develop a kind of cobalt coating on the particle surface by way of a solution-recrystallisation process which, apart from the above-mentioned considerations, may explain the improvement in the electrochemical properties by an increase in the electronic conductivity.

The proportion of Ni in the nickel mixed hydroxide according to the invention is preferably 60 to 92 mol %, more preferably 65 to 85 mol % and particularly preferably 75 to 80 mol %. In other words, the total proportion of the elements $M_a$, $M_b$ and $M_c$ is preferably 40 to 8 mol %, more preferably 35 to 15 mol % and particularly preferably 25 to 20 mol %, in each case based on the total amount of Ni, $M_a$, $M_b$ and $M_c$.

The proportion of the mixed valent metal $M_a$ present is preferably 10 to 40 mol %, more preferably 20 to 30 mol %, based on the total amount of the elements $M_a$, $M_b$ and $M_c$.

The proportion of the optionally used doping element $M_c$ is preferably 1 to 30 mol %, based on the total amount of the elements $M_a$, $M_b$ and $M_c$ but a maximum of 5 mol % based on the total amount of the elements Ni, $M_a$, $M_b$ and $M_c$.

The proportion of the trivalent elements $M_b$ is particularly preferably more than 60 mol %, based on the total amount of the elements $M_a$, $M_b$ and $M_c$, The degree of oxidation α of the mixed valent element $M_a$ present, defined according to the following formula (I), is preferably from 0.01 to 0.99, more preferably 0.1 to 0.9, most preferably 0.25 to 0.75, $$\alpha = \frac{M_a^{+(x+1)}}{M_a^{+(x+1)} + M_a^{+x}}, \quad (I)$$

wherein $M_a^{+(x+1)}$ means the molar quantity of the element $M_a$ in the higher oxidation state, $M_a^{+(x)}$ the molar quantity of the element $M_a$ in the lower oxidation state, and x a number between 1 and 3.

The nickel mixed hydroxides according to the invention are provided suitably in powder form, the average particle size of the powder being preferably 0.5 to 1000 μm, particularly preferably 2 to 100 μm and particularly preferably more than 3 μm, more preferably 3–15 μm.

The invention also provides a process for the preparation of the nickel mixed hydroxides described above, comprising the reaction of the reaction components required to obtain the relevant mixed hydroxides in the form of water-soluble salts of Ni and of the elements $M_a$, $M_b$ and optionally $M_c$ in a basic, aqueous medium for the co-precipitation of hydroxide reaction products with the formation of a homogeneous suspension of said reaction products, wherein either water-soluble salts of the element $M_a$ are used in different oxidation states or a water-soluble salt of the element $M_a$ is used in the lower oxidation state and a partial oxidation is carried out until the desired ratio is obtained between the different oxidation states of the element $M_a$, or a water-soluble salt of the element $M_a$ is used in the higher oxidation state and a partial reduction is carried out until the desired ratio is obtained between the different oxidation states of the element $M_a$, separation from the mother liquor, washing and drying of the reaction products.

The mixed hydroxides according to the invention may be prepared both in spherical and regular (non-spherical) morphology, the reaction in the first case being carried out advantageously in the presence of ammonia or ammonium salts.

The reaction must be carried out under basic conditions, preferably at a pH from 8 to 13.

If a partial oxidation of the element $M_a$ is carried out, oxidising agents known for such applications may be used, oxygen, $H_2O_2$, hypochlorite or peroxodisulfates being used in preference. The partial oxidation may be carried out advantageously by a controlled introduction of oxygen into the suspension forming. Generally speaking, a less than stoichiometric use of oxidising agents is suitable for partial oxidation. The desired ratio between the different oxidation states of the element $M_a$ may be controlled by varying the oxygen supply (for example, by mixing in pure oxygen to influence the oxygen partial pressure), the reaction temperature and/or the pH value.

In the case of Co, for example, a partial oxidation is achieved in an advantageous manner by the controlled use of atmospheric oxygen.

In the case of Fe, for example, water-soluble salts of both oxidation states may be used simultaneously.

If a partial reduction of the element $M_a$ is carried out, reducing agents known for such applications may be used.

If the process is carried out batchwise (batch process), it is expedient, after co-precipitation has ended, to carry out an ageing over several hours, for example, 15 to 20 hours, before further work up.

If the process is carried out continuously, the residence time is adjusted advantageously such that the desired mixed valent state of element $M_a$ is obtained. Average residence times of several hours, for example, 5 hours, have proved to be advantageous.

According to a further preferred process, the mixed nickel hydroxides according to the invention are prepared by anodic oxidation of at least one of the metal elements, particularly preferably at least the nickel component. To this end, the aqueous precipitation suspension is pumped round continuously between an electrolytic cell with nickel anode and a thermostat arranged outside the cell. In the circuit outside the electrolytic cell, the other metal components in the form of their water-soluble salts are added to the precipitation suspension, as well as alkali hydroxide, preferably sodium hydroxide, to adjust the pH. Moreover, the oxidising agent, preferably atmospheric oxygen, is introduced into the pumping circuit in order to adjust the degree of oxidation of the $M_a$ element. Precipitation suspension is discharged continuously or periodically by means of an overflow, precipitation product is filtered, washed, dried and optionally ground.

The anions incorporated in the precipitation product to ensure electroneutrality may then be exchanged for the preferred $CO_3$ anions by treating the precipitation product in an alkali carbonate or alkali hydrogen carbonate solution, preferably $Na_2CO_3$ solution.

A device for the electrolytic preparation of nickel mixed hydroxide is shown schematically in FIG. 6.

FIG. 6 shows an electrolytic cell 1 which contains two cathodes 2 and an anode 3. The electrolytic brine is pumped in the base of the cell 1 via the pump 4, the heat exchanger 5 and the pH sensor 6. Depending on the pH measurement 6, alkali hydroxide or hydrochloric acid is metered into the pumping circuit as indicated by arrow 7. Nickel hydroxide suspension is discharged from the pumping circuit by means of pump 9 and fed to the solids separating device 10. As shown by arrow 12, the solids are discharged. The brine from which solids have been removed may be recycled by means of pump 11 to the pumping circuit via electrolyte work up 16, optionally with the addition of water 15. Moreover, as indicated by arrow 17, a means is provided for introducing the oxidising agent. Moreover, doping salt solutions are fed into the pumping circuit by means of inlet 8. According to a preferred embodiment, the separating device 10 is designed in the form of a screen-type centrifuge which is operated in such a way that fine-particle nickel hydroxide particles are recycled with the filtrate to the pumping circuit via pump 11. Hydrogen gas generated during electrolysis is drawn off above the filling volume of the cell, as indicated by arrow 13.

IN THE DRAWINGS

Figure 1:
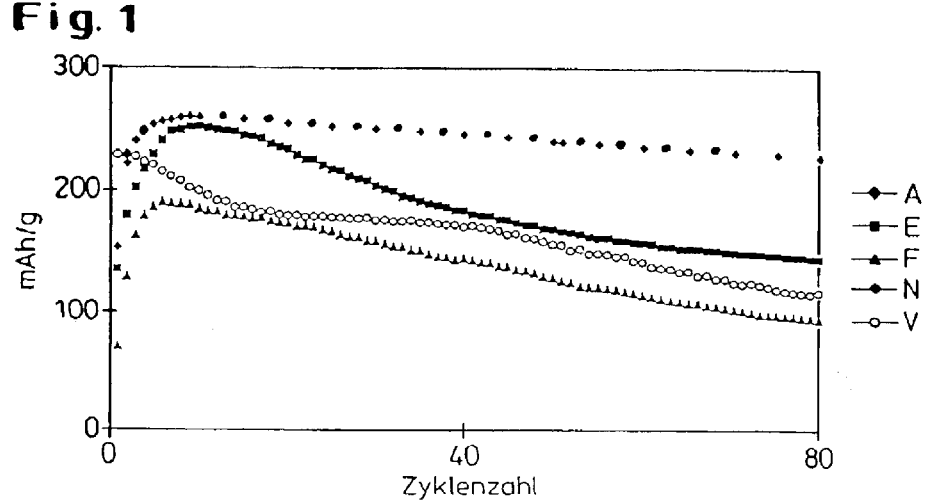
FIG. 1 shows the cycle behaviour of the sample A obtained in the examples and of comparison samples E, F, N and V in the half-cell test.

The nickel mixed hydroxide according to the invention is used preferably as a constituent of cathode materials in alkaline batteries, as in Ni/Cd or Ni/MH batteries, together with activators and auxiliaries known to the expert in the art.

The invention is explained in more detail on the basis of the examples below.

The examples below are illustrative examples in which all parts and percentages are by weight unless otherwise indicated.

A) Preparation of Various Nickel Mixed Hydroxides

Example 1

Sample A:
(3:1    Ni:dop.,    3:1    Al:Co)
$Ni_{0.75}Al_{0.188}Co_{0.063}(OH)_2 \cdot mCO_3 \cdot nH_2O$ 0.1 mol of $Ni(NO_3)_2 \cdot 6H_2O$ are dissolved in 200 ml of $H_2O$ with 0.025 mol of $Al(NO_3)_3 \cdot 9H_2O$ and 0.0083 mol of $Co(NO_3)_2 \cdot 6H_2O$ and, with vigorous stirring (speed 400 rpm) to promote an increased introduction of atmospheric oxygen, metered into a charge of 0.02 mol of $Na_2CO_3$+NaOH in 500 ml of water (pH=12.5, 75°°C.) over a period of 2 h. During precipitation and the post-reaction time (about 3 h), the pH and temperature are kept constant. After an ageing period (with stirring) of about 18 h, the suspension is filtered over a pressure filter and washed to a neutral pH with water. The product mixture is then diluted to 750 ml and spray-dried.

Example 2

Sample B:

(3:1    Ni:dop.,    3:1    Al:Co)
$Ni_{0.75}Al_{0.188}Co_{0.063}(OH)_2 \cdot mCO_3 \cdot nH_2O$ 10 mol of $NiSO_4 \cdot 7H_2O$, 1.25 mol of $Al_2(SO_4)_3 \cdot 16H_2O$ and 0.83 mol of $CoSO_4 \cdot 7H_2O$ are dissolved in 9 l $H_2O$. The solution is adjusted with $H_2SO_4$ to pH=1, heated to 75° C. and, with vigorous stirring (400 rpm) to promote an increased introduction of atmospheric oxygen, metered into a charge of 15.58 mol of $Na_2SO_3$+NaOH in 25 l of water (pH=12.5; 65–70° C.) (t=70 min). During precipitation and the post-reaction time (about 2 h) the pH and temperature are kept constant. After an ageing period (with stirring) of about 16 h, the suspension is filtered over a membrane filter press and pressed, then dried at 50° C. in a circulating air drying cabinet. The ground intermediate product is washed on a suction filter in portions with water, sodium hydroxide solution at pH=12.5 and then again with water and dried at 50° C. in a vacuum drying cabinet until a constant weight is obtained.

Example 3

Sample C

Composition as for sample B, but continuous process.

| | |
|---|---|
| Batch size: | 180 mol (incl. 6 τ preliminary run) |
| Reactor volume: | 28 l |
| Average residence time: | 5 h |
| Volumetric flow: | 5.2 l/h |
| Substance flow: | 2 mol/h based on $Ni^{2+}$ |
| pH: | 12.5 |
| Temperature: | 75° C. |
| Equalising alkali: | NaOH, 7 mol/l |
| Carbonate stream: | 1.321 mol/h |

The collected reaction suspension is filtered over a membrane filter press after an ageing period of about 18 h (with stirring), pressed and then dried at 50° C. in a circulating air drying cabinet. The (ground) intermediate product is re-suspended in water and filtered again over a membrane filter press and washed. The washed product is dried at 50° C. in a circulating air drying cabinet until a constant weight is obtained.

The analytical results of the samples A to C prepared according to the above examples are summarised in table 1 below.

TABLE 1

Analysis of samples A–C

| Example | Ni (wt. %) | Al (wt. %) | Co (II) (wt. %) | Co (III) (wt. %) | $CO_3$ (wt. %) | $SO_4$ (ppm) | $NO_3$ (ppm) | Loss on drying 105° C./2 h (wt. %) |
|---|---|---|---|---|---|---|---|---|
| Sample A | 38.80 | 3.4  | 4.8  | 1.5 | 10.5 | —    | <2000 | 5.2  |
| Sample B | 39.55 | 4.62 | 3.31 | 1.4 | 9.1  | 6350 | <4    | 4.94 |
| Sample C | 40.09 | 4.7  | 3.55 | 1.6 | 8.4  | 6800 |       | 2.20 |

Example 4

Sample D:

(3.32:1 Ni/Mg:dop., 3:1 Al:Co)
$Ni_{0.69}Mg_{0.074}Al_{0.174}Co_{0.058}(OH)_2*mCO_3*nH_2O$ 0.1 mol of $Ni(NO_3)_2*6H_2O$ are dissolved in 100 ml of $H_2O$ with 0.0107 mol of $Mg(NO_3)_2*6H_2O$ and 0.025 mol of $Al(NO_3)_3*9H_2O$+0.0083 mol of $Co(NO_3)_2*6H_2O$ and, with vigorous stirring (speed 400 rpm) to promote an increased introduction of atmospheric oxygen, metered into a charge (75° C.) of 0.02 mol of $K_2CO_3$+KOH in 150 ml of water (pH=12.5) (t=10 min). During precipitation and the post-reaction time (about 3 h), the pH and temperature are kept constant. After an ageing period (with stirring) of about 15 h, the suspension is filtered over a pressure filter and washed to a neutral pH with water. The product is then dried under vacuum at 50° C. until a constant weight is obtained.

Comparison Example 1

Comparison sample E:

(3:1 Ni:dop., 3:1 Al:Co)
$Ni_{0.75}Al_{0.188}Co_{0.063}(OH)_2*mCO_3*nH_2O$ 0.1 mol of $Ni(SO_4)*7H_2O$, 0.0125 mol of $Al_2(SO_4)_3*6H_2O$ and 0.0083 mol of $Co(SO_4)*7H_2O$ are dissolved in 100 ml of $H_2O$ (introduction of $N_2$) and, with vigorous stirring (400 rpm), metered into a charge (75° C. under an $N_2$ atmosphere) of 0.245 mol of $Na_2CO_3$ and NaOH in 200 ml of water (pH=12.5). During precipitation and the post-reaction time (about 2.5 h) the pH and temperature are kept constant. After an ageing period (with stirring) of about 18 h, the suspension is filtered over a pressure filter and washed to a neutral pH with water, then dried at 50° C. until a constant weight is obtained.

Cobalt is present in the divalent form as well as Al(III), corresponding to a material according to the prior art according to EP 793 285.

Comparison Example 2

Comparison sample F:

(3:1 Ni:dop., 3:1 Al:Co) $Ni_{0.75}Al_{0.188}Co_{0.063}(OH)_2$ 0.188$NO_3*nH_2O$ 0.1 mol of $Ni(NO_3)_2*6H_2O$, 0.025 mol of $Al(NO_3)_3*9H_2O$ and 0.0083 mol of $Co(NO_3)_2*6H_2O$ are dissolved in 200 ml of $H_2O$ with 0.15 mol of hexamethylene tetramine and adjusted to pH 4. The solution is heated slowly to boiling point, with vigorous stirring (400 rpm) and further hexamethylene tetramine is added in 0.075 mol portions (dissolved in 30 ml of water) until a sample of the supernatant solution exhibits no further precipitation with hexamethylene tetramine. After an ageing period of about 96 h, the suspension is filtered over a pressure filter, washed with water to a neutral pH and dried. Yield: 10.4 g (69.5%).

The preparation took place with the use of hexamethylene tetramine under reducing conditions. Reducing conditions are also present in the cathodic deposition process which is used in the case of materials according to the prior art according to EP 793 285.

Example 5

Sample G:

(3:1 Ni:dop., 3:1 Al:Co)
$Ni_{0.75}Al_{0.188}Co_{0.063}(OH)_2*mSO_4*nH_2O$ 0.1 mol of $Ni(SO_4)*7H_2O$ are dissolved in 100 ml of $H_2O$ with 0.0125 mol of $Al_2(SO_4)_3*6H_2O$ and 0.0083 mol of $Co(SO)_4*7H_2O$ and, with vigorous stirring (400 rpm) to promote a high introduction of atmospheric oxygen, metered into a charge (75° C.) of NaOH in 150 ml of water (pH=12.5) (t=10 min). During precipitation and the post-reaction time (about 15 h) the pH and temperature are kept constant. After an ageing period (with stirring) of about 17 h, the suspension is filtered over a pressure filter and washed to a neutral pH with water. The product is then dried under vacuum at 50° C. until a constant weight is obtained.

The preparation took place without carbonate and thus leads to the incorporation of sulfate instead of carbonate ions in the intermediate layer. A subsequent partial carbonation by admission of air ($CO_2$) was permitted.

Example 6

Sample H:

(2:1 Ni:dop., 3:1 Al:Co)
$Ni_{0.66}Al_{0.248}Co_{0.0825}(OH)_2*mCO_3*nH_2O$ 0.1 mol of $Ni(NO_3)_2*6H_2O$ are dissolved in 100 ml of $H_2O$ with 0.0375 mol of $Al(NO_3)_3*9H_2O$ and 0.0125 mol of $Co(NO_3)_2*6H_2O$ and, with vigorous stirring (400 rpm), introduced dropwise into a charge (75° C.) of 0.02 mol of $Na_2CO_3$+KOH in 150 ml of water (pH=12.5) (t=3 h). During precipitation and the post-reaction time (about 4 h), the pH and temperature are kept constant. After an ageing period (with stirring) of about 15 h, the suspension is filtered over a pressure filter and washed to a neutral pH with water, during which process the suspension should never be filtered completely to dryness. The product mixture is then dried at 50° C./200 mbar until a constant weight is obtained.

Example 7

Sample I:

(11:1 Ni:dop., 2:1 Al:Co; (superlattice 33:2:1))

0.165 mol of $Ni(NO_3)_2*6H_2O$ are dissolved in 400 ml of $H_2O$ with 0.01 mol of $Al(NO_3)_3*9H_2O$ and 0.005 mol of $Co(NO_3)_2*6H_2O$. With vigorous stirring (400 rpm) and the introduction of atmospheric oxygen over a frit, the solution is metered into a charge of 0.04 mol of $Na_2NO_3$+NaOH in 1000 ml of H$_2$O (pH=12.5; 75° C.) (t=3 h). During precipitation and the post-reaction time (with stirring) of about 18 h, the suspension is filtered over a pressure filter and washed to a neutral pH with water; the product mixture is then diluted to 1500 ml and then spray-dried.

Example 8

Sample J:

(3:1 Ni:dop., 2:1 Al:Co; (superlattice 9:2:1))

0.09 mol of Ni(NO$_3$)$_2$*6H$_2$O, 0.02 mol of Al(NO$_3$)$_3$*9H$_2$O and 0.01 mol of Co(NO$_3$)$_2$*6H$_2$O are dissolved in 200 ml of H$_2$O and, with the introduction of an oxygen/air mixture, introduced into a charge of 0.02 mol of Na$_2$CO$_3$ and NaOH in 500 ml of water (pH=12.5; 75° C.) over a period of 2 h. During precipitation and the post-reaction time (about 3 h), the pH and temperature are kept constant. After 18 h ageing (with stirring), the suspension is filtered over a pressure filter, washed to a neutral pH and dried in a vacuum drying cabinet at 50° C.

Example 9

Sample K (3:1 Ni:dop., 2:1 Al:Fe)

0.09 mol of Ni(NO$_3$)$_2$*6H$_2$O and 0.02 mol of Al(NO$_3$)$_3$*9H$_2$O are dissolved with 0.0033 mol of Fe(NO$_3$)$_2$*6H$_2$O and 0.0066 mol of Fe(NO$_3$)$_3$*6H$_2$O and metered, with stirring, into a charge (35° C.) of 0.02 mol of Na$_2$CO$_3$+ NaOH in 500 ml of water (pH=12.5) (t=2 h). During precipitation and the post-reaction time (about 3 h), the pH and temperature are kept constant. After an ageing period of 18 h (with stirring), the suspension is filtered over a pressure filter, washed to a neutral pH and dried in a vacuum drying cabinet at 50° C. All the steps are carried out under a nitrogen atmosphere.

Example 10

Sample L:

(2.9:1 Ni: dop., 3:1 Al:Co)

Figure 6:
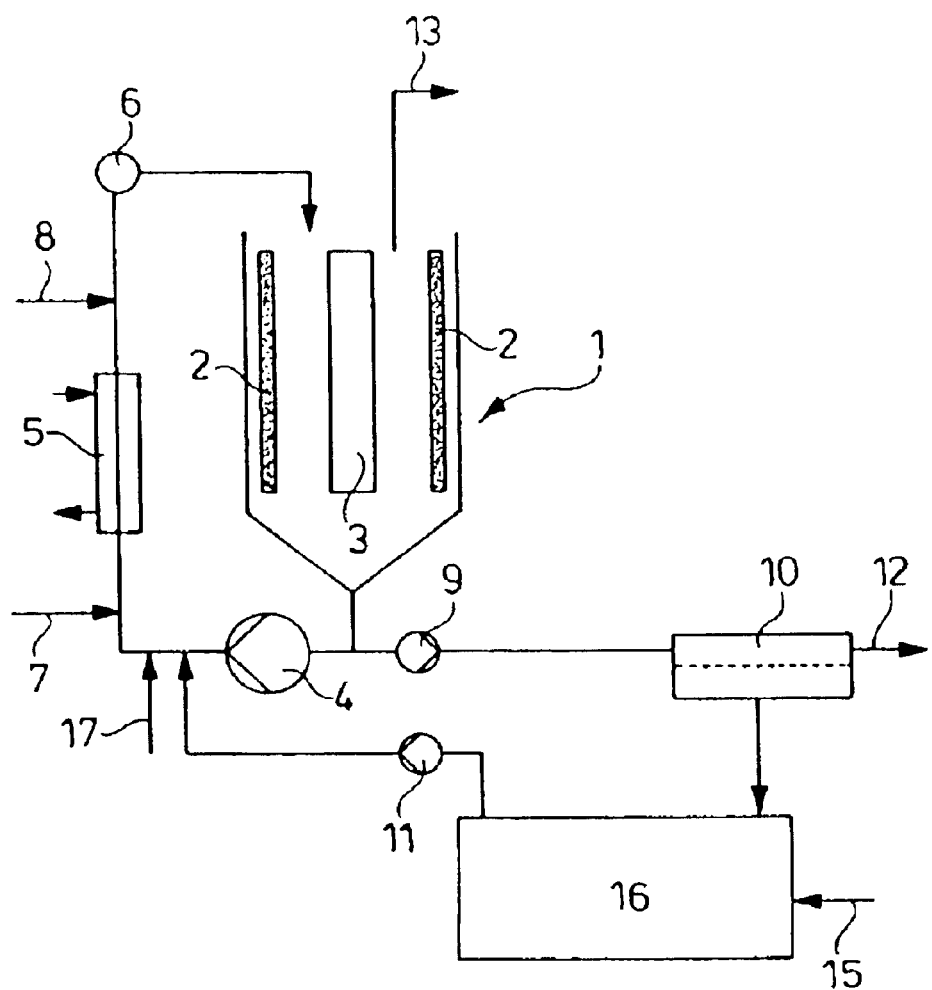

800 ml/h of an electrolyte solution having the composition 63.5 g/l of NaCl, 7.6 g/l of CoCl$_2$ and 23.4 g/l of AlCl$_3$ were pumped continuously at 8 into a test electrolytic cell 1 with a capacity of 3 l (according to FIG. 6, but without brine recycling), which is fitted with two Ni cathodes 2 and an Ni anode 3. Electrolysis was carried out at a current density of about 65 mA/cm$^2$ (I=30 A), at a temperature of 20° C. (thermostat 5) with anodic Ni dissolution of about 32.8 g/h. The pH was kept at 12.0 (pH measurement 6) during electrolysis by the automatic addition 7 of 2.5 molar sodium hydroxide solution. The electrolyte solution was pumped by means of pump 4. Oxygen was injected into the pumping circuit at 1 l. Electrolysis took place throughout the period in a stable manner at a voltage of about 3V. The overflow was drawn off by means of pump 9 and filtered by suction at 10. The solid 12 obtained was dried in a circulating air drying cabinet at a temperature of 60° C. The dried material was ground (<500μ) using a laboratory mill and carbonated in a 1 molar Na$_2$CO$_3$ solution in a ratio to the dry material of 5:1 for about 2 hours at 70° C., with stirring, in a glass beaker. The suspension containing the product was then filtered by suction and the resulting solid on the filter was washed with about 8 l of a hot (about 65° C.) 1 g/l sodium hydroxide solution. The product was then dried in a circulating air drying cabinet at a temperature of 60° C. Yield: 80.3 g of nickel hydroxide material per hour.

The chemical analysis of the product gives the following composition:

| | |
|---|---|
| Ni | 40.4 wt. % |
| Al | 4.87 wt. % |
| Co, total | 3.52 wt. % (1.7 wt. % Co$^{3+}$) |
| CO$_3$ | 6.47 wt. % |
| Cl | <50 ppm |
| SO$_4$ | <50 ppm |
| Na | 325 ppm. |

The average particle size (Mastersizer D50) was 16 μm, the BET surface 3.3 m$^2$/g, the density (He pyknometer) 2.51 g/cm$^3$ and the tap density 1.6 g/cm$^3$.

Example 11

Sample M:

(4.5:1 Ni:dop., 3:1 Al:Co)

Electrolysis was carried out in the same way as in example 10. The electrolyte solution fed in had a composition of 57.4 g/l of NaCl, 4.56 g/l of CoCl$_2$ and 14.01 g/l of AlCl$_3$. The pH was kept at 12.5. The voltage was 3.2V; the anodic Ni dissolution was 29.5 g/h.

The overflow from the electrolytic cell was collected over 6 hours, left to stand for about 20 hours to age and then filtered by suction. The resulting solid was washed on the suction filter with about 3.8 l of a 1 g/l sodium hydroxide solution, then with about 1.9 l of a 1 molar Na$_2$CO$_3$ solution and then again with about 3.8 l of a 1 g/l sodium hydroxide solution. The temperature of the wash solutions was about 20° C. The product was then dried in a circulating air drying cabinet at a temperature of about 60° C. The dried material was ground using a laboratory mill (<500μ) and then analysed. Yield: 453 g of nickel hydroxide material.

The chemical analysis gave the following composition:

| | |
|---|---|
| Ni | 43.4 wt. % |
| Al | 3.33 wt. % |
| Co, total | 2.42 wt. % (1.12 wt. % Co$^{3+}$) |
| CO$_3$ | 9.09 wt. % |
| Cl | 510 ppm |
| SO$_4$ | <50 ppm |
| Na | 0.83 ppm. |

The average particle size (Mastersizer D50) was 38 μm, the BET surface <1 m$^2$/g, the physical density (He pyknometer) 2.45 g/cm$^3$ and the tap density 1.6 g/cm$^3$ and the loss on drying (105° C., 2 h) was 4.75 wt. %.

Example 12

Sample N:

(4:1 Ni:dop., 3:1 Al:Co)

An electrolytic cell with a capacity of 400 l was used. Electrolysis was carried out in a similar way to example 10. 55 l/h of an electrolyte solution having the composition 52.7 g/l of NaCl, 5.5 g/l of CoCl$_2$ and 17.0 g/l AlCl$_3$ were added. The electrolysis current was 2000 A with an anode current density of 69 mA/cm$^2$. The Ni dissolution was 2187 g/h, the pH 12.0. After a preliminary run time of about 20 h, the outflowing suspension was collected for 28 hours. This 28-hour collection sample (1648 l) was then filtered by suction and the resulting solid dried in a circulating air drying cabinet at a temperature of 70 to 80° C. The dried material was ground (<1000 μm) using a conical grinder and carbonated with a 1 molar $Na_2CO_3$ solution in a ratio to the dry material of 5:1 for about 2 hours at 70° C., with stirring, in a 450 l reactor. The suspension was then filtered by suction and the resulting solid was washed on the suction filter with about 2.5 m³ of a hot (about 65° C.) 1 g/l sodium hydroxide solution. The product was then dried in a circulating air drying cabinet at a temperature of 70 to 80° C.

The chemical analysis gave the following composition of the product:

| | | |
|---|---|---|
| Ni | 44.40 | wt. % |
| Al | 3.75 | wt. % |
| Co, total | 2.82 | wt. % (2.0 wt. % $Co^{3+}$) |
| $CO_3$ | 8.33 | wt. % |
| Cl | 360 | ppm |
| $SO_4$ | <50 | ppm |
| Na | 270 | ppm. |

Figure 7:
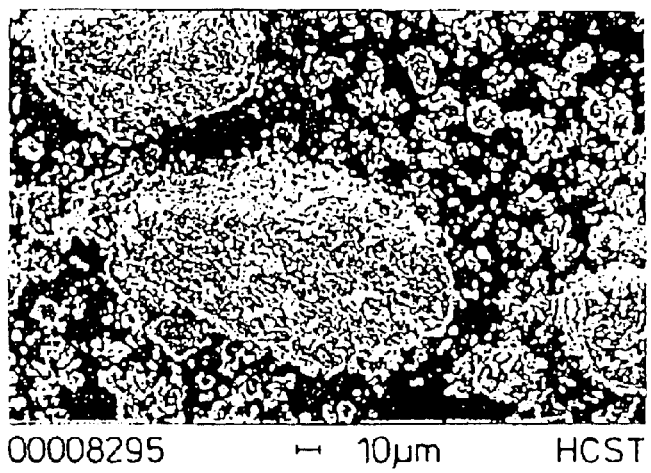
Figure 7:
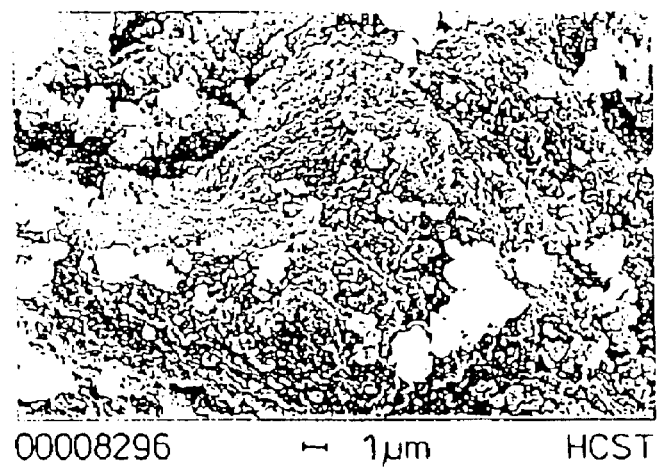
Figure 7:
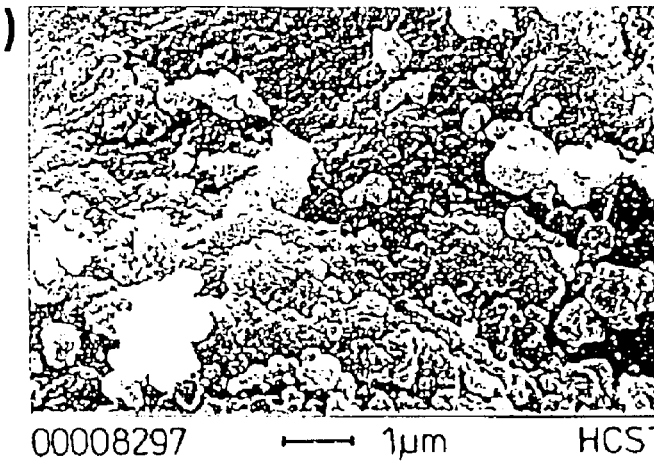

The average particle size (Mastersizer D50) was 51.8 μm, the BET surface 6.35 m²/g, the physical density (He pyknometer) 2.7 g/cm³ and the tap density 1.8 g/cm³. FIG. 7 shows an SEM photo of the powder.

B) Electrochemical Characterisation

In order to obtain an electrochemical characterisation of the samples, charging/discharge cycles were carried out with a five-hour charging and discharge current in 30% KOH against Hg/HgO with a charging factor of 1.5. The electrode material of nickel mixed hydroxide (active material), 33% graphite as conductive additive and hydroxypropylmethylcellulose as binder was pasted into nickel foam as substrate.

FIG. 1 shows the cycle behaviour of samples A and N and of comparison samples E and F according to the prior art (EP 0 793 285) and of comparison sample V, a Co(III), Mn(III) and Al(III)-containing nickel hydroxide powder according to EP 0 712 174 in the half-cell test.

Comparison samples E and F according to EP 0 793 285 contain divalent cobalt in addition to trivalent other additional cations since divalent cobalt e.g. in combination with trivalent aluminium is used as starting compounds and also no oxidising agent is used. No details about cycle behaviour and capacity values can be derived from EP 0 793 285 so comparison samples were prepared: samples E and F were prepared maintaining the divalency for cobalt, once under an $N_2$ atmosphere (E) and once under reducing conditions (F), and compared as prior art with sample A according to the invention.

As FIG. 1 shows, both the capacity values and the cycle behaviour of samples A and N in which Co(III) as well as Co(II) ions are present are markedly superior to the materials according to the prior art in which the cobalt ions are present only in the divalent form. The positive influence of the mixed valency for cobalt becomes particularly pronounced by a comparison with sample E which was prepared not under reducing conditions but only with the exclusion of oxygen. Slight partial oxidation of the surface during work up is conceivable here, which could explain the improvement compared with the material prepared under reducing conditions (sample F). Samples A and N also exhibit marked improvements in terms of capacity and cycle stability compared with comparison sample V.

Figure 2:
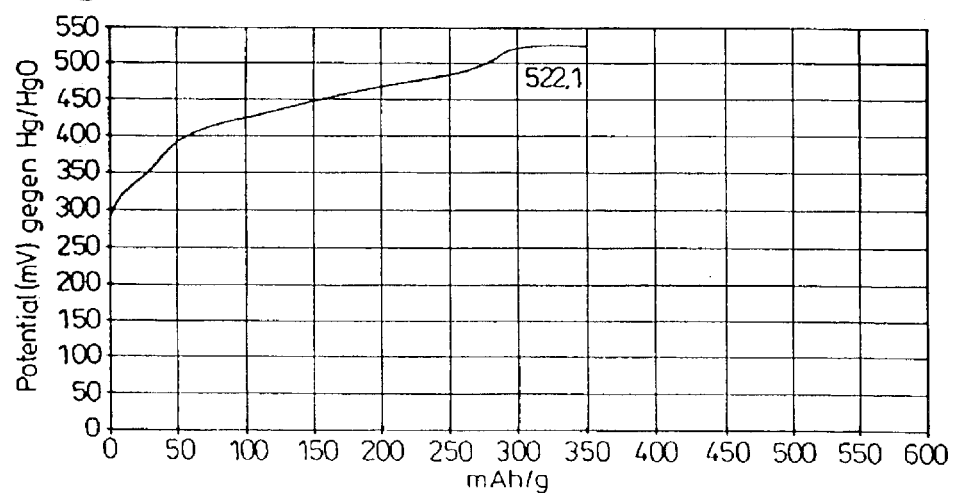
FIG. 2 shows the charge curve of sample A in the 10th cycle.
Figure 3:
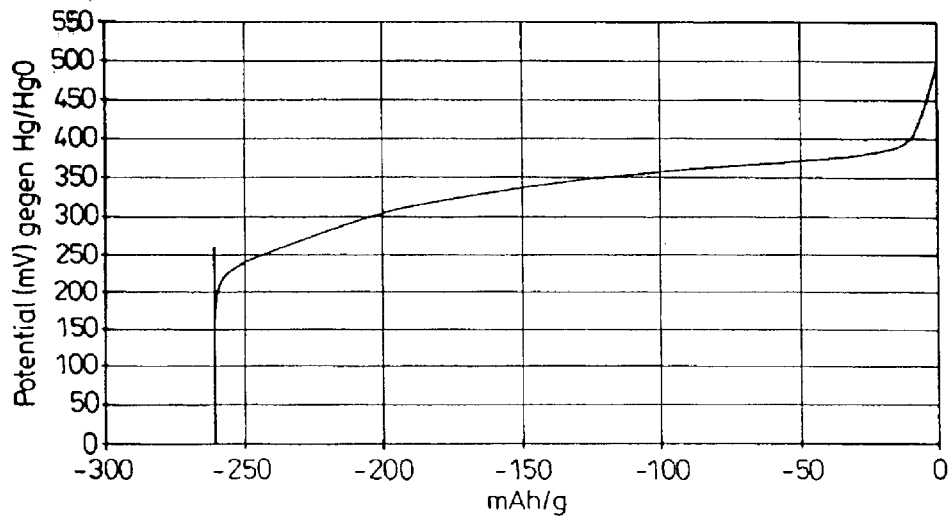
FIG. 3 shows the discharge curve of sample A in the 10th cycle.

The potential curve of sample A is shown in FIGS. 2 and 3, FIG. 2 showing the charging curve and FIG. 3 showing the discharge curve in the 10th cycle, in each case against Hg/HgO.

Figure 4:
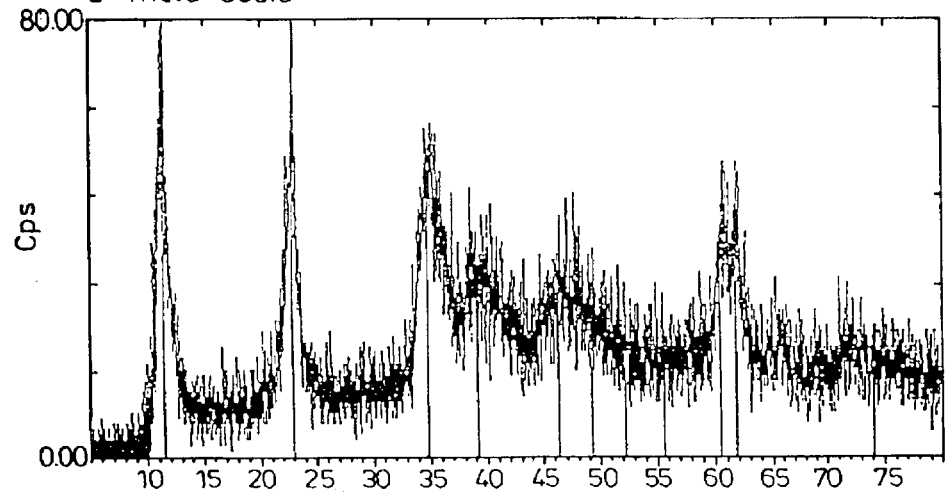
FIG. 4 shows the x-ray diffraction spectrum of sample A.
Figure 5:
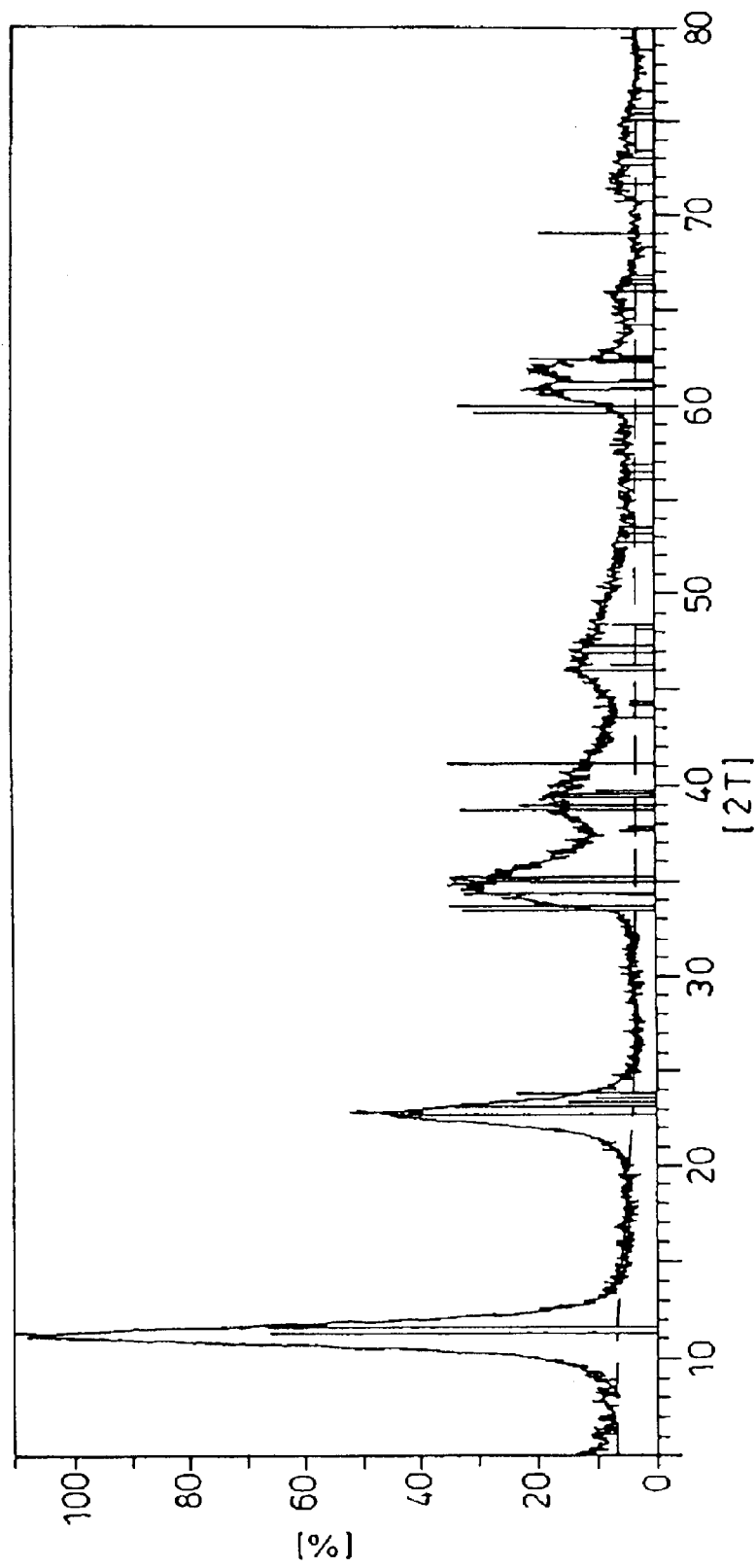

The X-ray diffraction spectrum of sample A is shown in FIG. 4. The material of sample A shows the reflections of the hydrotalcite type with a distance of about 7.8 Å between the layers. In contrast to β-Ni(OH)$_2$ (brucite type), an expanded layer structure is present. FIG. 5 shows the X-ray diffraction spectrum of sample L.

Although the present invention has been described in detail with reference to certain preferred versions thereof, other variations are possible. Therefore, the spirit and scope of the appended claims should not be limited to the description of the versions unstained therein.

What is claimed is:

1. Nickel mixed hydroxide with Ni as the main element and with a layer structure, comprising
   a) at least one element $M_a$ from the group comprising Fe, Cr, Co, Ti, Zr and Cu which is present in two different oxidation states which differ by one electron in terms of the number of outer electrons, wherein the degree of oxidation α of the element $M_a$, defined according to the following formula (I), is from 0.25 to 0.75

$$\alpha = \frac{M_a^{+(x+1)}}{M_a^{+(x+1)} + M_a^{+x}}, \tag{I}$$

wherein $M_a^{+(x+1)}$ means the molar quantity of the element $M_a$ in the higher oxidation state, and $M_a^{+(x)}$ the molar quantity of the element $M_a$ in the lower oxidation state, and x is a number between 1 and 3;
   b) at least one element $M_b$ from the group comprising B, Al, Ga, In and rare earth metals present in the trivalent oxidation state;
   c) optionally at least one element $M_c$ from the group comprising Mg, Ca, Sr, Ba and Zn present in the divalent oxidation state;
   d) apart from the hydroxide, at least one additional anion selected from the group consisting of halides, carbonate, sulfate, acetate, oxalate, borate and phosphate in a quantity sufficient to preserve the electroneutrality of the mixed hydroxide; and
   e) water of hydration in a quantity which stabilizes the relevant structure of the mixed hydroxide.

2. The nickel mixed hydroxide according to claim 1, wherein the proportion of Ni is from 60 to 92 mol % and the total proportion of the elements $M_a$, $M_b$ and $M_c$ is from 40 to 8 mol %, in each case based on the total amount of Ni, $M_a$, $M_b$ and $M_c$.

3. The nickel mixed hydroxide according to claim 1, wherein the proportion of the element $M_a$ is from 10 to 40 mol %, based on the total amount of the elements $M_a$, $M_b$ and $M_c$.

4. The nickel mixed hydroxide according to claim 1, wherein the proportion of the element $M_c$ is from 1 to 30 mol %, based on the total amount of elements $M_a$, $M_b$ and $M_c$.

5. The nickel mixed hydroxide according to claim 1, wherein the nickel mixed hydroxide is in the form of a powder with an average particle size from 1 to 100 μm.

6. The nickel mixed hydroxide according to claim 1, wherein the rare earth metals of the element $M_b$ are selected from the group consisting of Sc, Y and La.

7. The nickel mixed hydroxide according to claim 1, wherein the halides are selected from the group consisting of fluoride and chloride.

8. The nickel mixed hydroxide according to claim 1, wherein the nickel mixed hydroxide is a cathode material in an alkaline battery.

9. A process for preparing a nickel mixed hydroxide with Ni as the main element and with a layer structure, comprising:

a) at least one element $M_a$ selected from the group consisting of Fe, Cr, Co, Ti, Zr and Cu which is present in two different oxidation states which differ by one electron in terms of the number of outer electrons, wherein the degree of oxidation α of the element $M_a$, defined according to the following formula (I), is from 0.25 to 0.75

$$\alpha = \frac{M_a^{+(x+1)}}{M_a^{+(x+1)} + M_a^{+x}}, \quad (I)$$

wherein $M_a^{+(x+1)}$ means the molar quantity of the element $M_a$ in the higher oxidation state, and $M_a^{+(x)}$ the molar quantity of the element $M_a$ in the lower oxidation state, and x is a number between 1 and 3;

b) at least one element $M_b$ from selected from the group consisting of B, Al, Ga, In and rare earth metals present in the trivalent oxidation state;

c) optionally at least one element $M_c$ selected from the group consisting of Mg, Ca, Sr, Ba and Zn present in the divalent oxidation state;

d) apart from the hydroxide, at least one additional anion selected from the group consisting of halides, carbonate, sulfate, acetate, oxalate, borate and phosphate in a quantity sufficient to preserve the electroneutrality of the mixed hydroxide; and e) water of hydration in a quantity which stabilizes the relevant structure of the mixed hydroxide, the process comprising reacting components required to obtain the relevant mixed hydroxides in the form of water-soluble salts of Ni and of the elements $M_a$, $M_b$ and optionally $M_c$ in a basic, aqueous medium for the co-precipitation of hydroxide reaction products with the formation of a homogeneous suspension of said reaction products, wherein either water-soluble salts of the element $M_a$ are used in different oxidation states or a water-soluble salt of the element $M_a$ is used in the lower oxidation state and a partial oxidation is carried out until the desired ratio is obtained between the different oxidation states of the element $M_a$, or a water-soluble salt of the element $M_a$ is used in the higher oxidation state and a partial reduction is carried out until the desired ratio is obtained between the different oxidation states of the element $M_a$, separation of the water from the suspension, and drying of the reaction products.

10. The process according to claim 9, wherein at least one of the reaction components is introduced into the aqueous medium by anodic oxidation of the corresponding metal.

11. The process according to claim 9, wherein the reaction is carried out at a pH from 8 to 13.

12. The process according to claim 9, wherein partial oxidation is carried out by using oxygen, $H_2O_2$, hypochlorite, peroxodisulfates or percarbonates as oxidizing agent.

* * * * *

UNITED STATES PATENT AND TRADEMARK OFFICE
CERTIFICATE OF CORRECTION

PATENT NO. : 6,849,208 B1
DATED : February 1, 2005
INVENTOR(S) : Viktor Stoller et al.

It is certified that error appears in the above-identified patent and that said Letters Patent is hereby corrected as shown below:

Column 12,
Line 20, delete Equation (I) and insert the following:

$$\alpha = \frac{M_a^{+(x+1)}}{M_a^{+(x+1)} + M_a^{+x}} \quad (I)$$

Column 13,
Line 10, delete Equation (I) and insert the following:

$$\alpha = \frac{M_a^{+(x+1)}}{M_a^{+(x+1)} + M_a^{+x}} \quad (I)$$

Signed and Sealed this

Twenty-fourth Day of May, 2005

JON W. DUDAS
*Director of the United States Patent and Trademark Office*